May 17, 1932.  R. J. BRITTAIN, JR., ET AL  1,859,265
CAR FRAME SUPPORT AND JOURNAL BOX
Filed Feb. 14, 1930  2 Sheets-Sheet 1
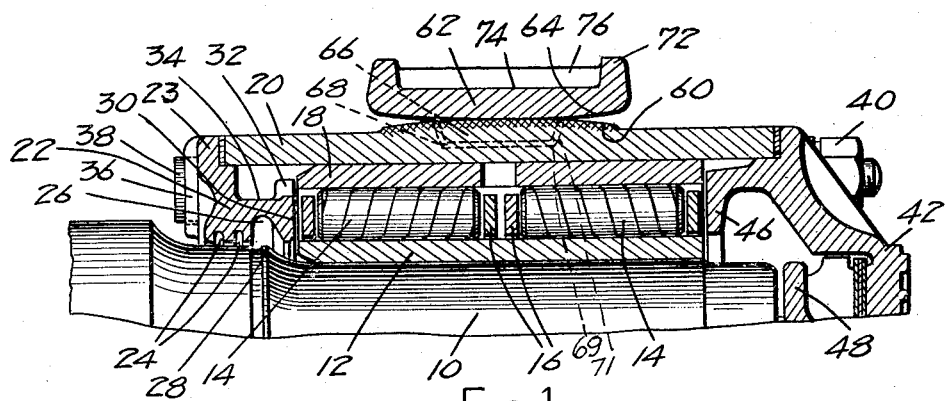
FIG_1.
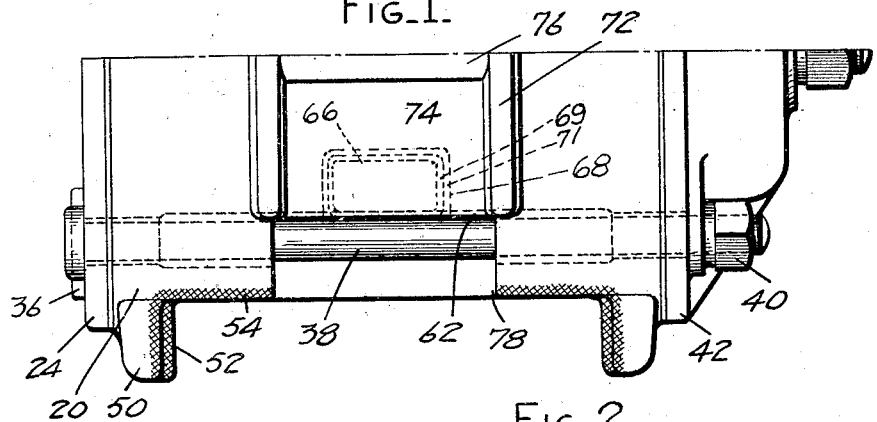
FIG_2.
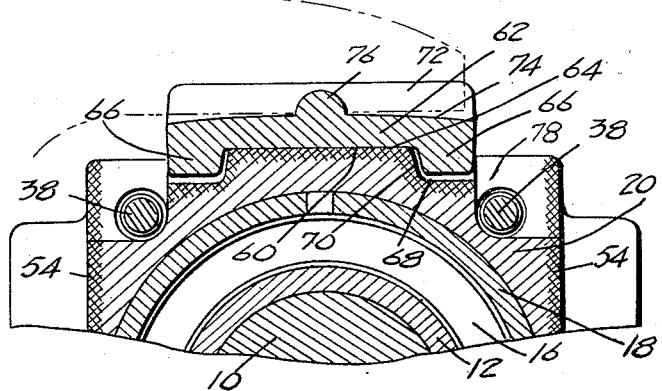
FIG_3.
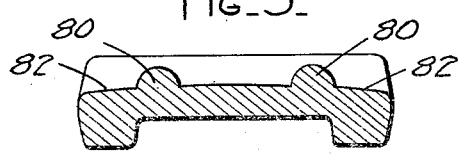
FIG_4.
INVENTORS:
RICHARD J. BRITTAIN, JR.
OTTO W. YOUNG.
BY Gales P. Moore
THEIR ATTORNEY

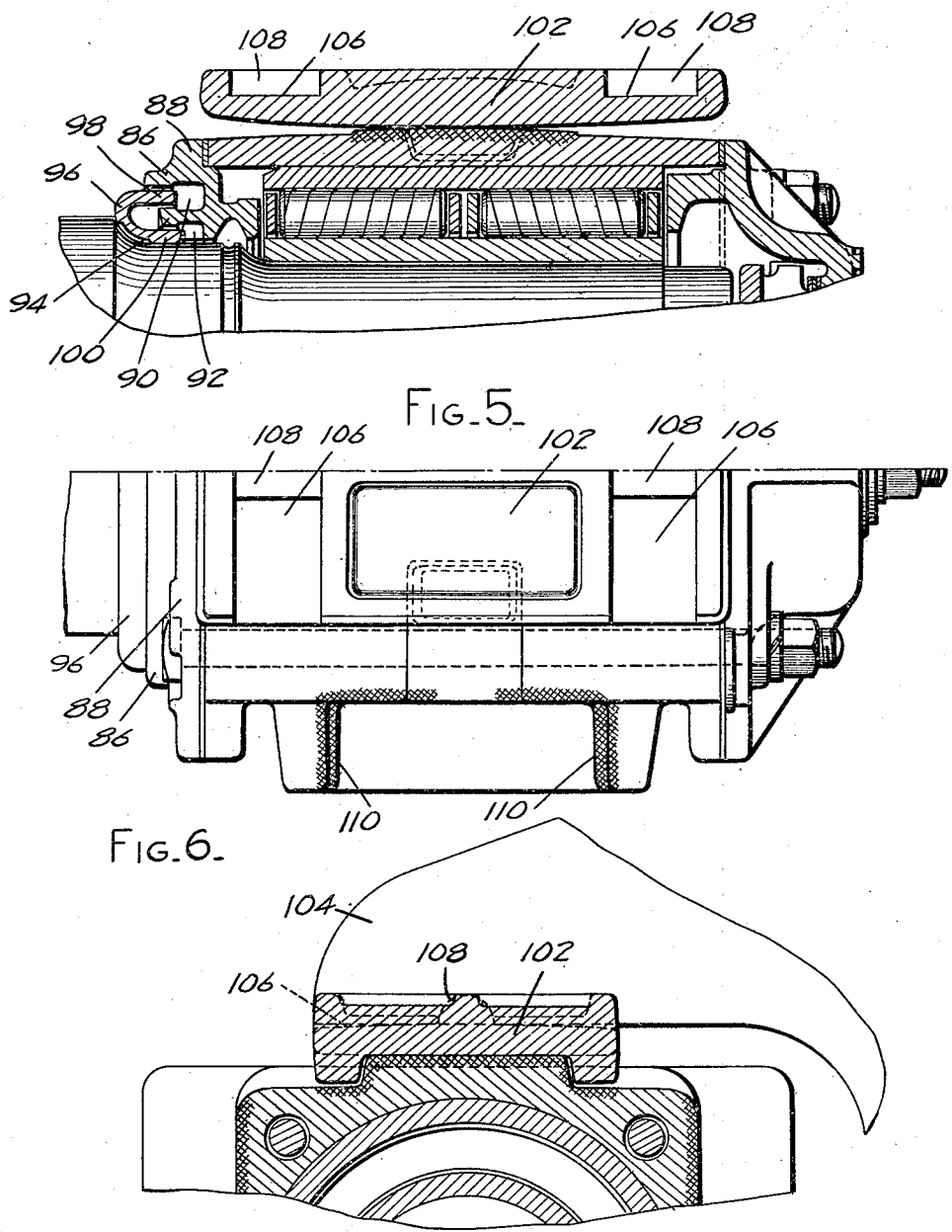

Patented May 17, 1932

1,859,265

UNITED STATES PATENT OFFICE

RICHARD J. BRITTAIN, JR., OF BLOOMFIELD, AND OTTO W. YOUNG, OF EAST ORANGE, NEW JERSEY, ASSIGNORS TO GENERAL MOTORS CORPORATION, OF DETROIT, MICHIGAN, A CORPORATION OF DELAWARE

CAR FRAME SUPPORT AND JOURNAL BOX

Application filed February 14, 1930. Serial No. 428,407.

This invention relates to car frame supports and journal boxes and comprises all the features of novelty herein disclosed. An object of the invention is to provide an improved device for connecting a car frame member to a journal box. Another object is to provide an improved equalizer or self adjusting seat plate for transferring load from a car frame member to a journal box. To these ends and to improve generally and in detail upon devices of this character, the invention also consists in the various matters hereinafter described and claimed.

In its broader aspects, the invention is not necessarily limited to the specific constructions selected for illustration in the accompanying drawings in which Fig. 1 is a longitudinal, vertical section through the upper portion of a journal box and associated parts.

Fig. 2 is a top plan view of one of the two symmetrical halves of the device.

Fig. 3 is a central, vertical cross-sectional view.

Fig. 4 is a central, vertical cross-sectional view of a modified form of seat plate.

Fig. 5 is a view similar to Fig. 1 of a modified construction.

Fig. 6 is a plan view of one of the two symmetrical halves of the device of Fig. 5 and Fig. 7 is a central cross sectional view of Fig. 5.

In Figs. 1 and 3 the numeral 10 indicates a shaft or axle with a bearing sleeve 12 for roller bearings 14 having end rings 16. The rollers run on an outer raceway provided by a sleeve 18 in the straight cylindrical bore of a housing, herein shown as a journal box 20. The inner end of the box is closed by a cap 22 having a flange 23 engaging a gasket at the end of the box. The cap has grease grooves 24 adjacent to the axle and a groove 26 arranged to receive oil thrown off from a rib 28 on the axle and drain it into the bottom of the box. The cap also has a flat annular face 30 to engage the adjacent bearing end ring 16 and lugs 32 to locate the outer race sleeve 18. Externally, the cap has a relief groove 34 to let oil out of the bearing sleeve 18 and conduct it to the bottom of the box, thus helping to prevent the oil from building up a pressure tending to induce leakage at the axle. The cap has lugs 36 to engage bolt heads on bolts 38 which traverse straight through the box and have nuts 40 to secure an end cap 42 against the other end of the box. The cap 42 has an internal flange 46 at the outer end of the bearings and carries a thrust block 48 opposite to the end of the axle. Both sides of the box have pedestal flanges 50 with crowned surfaces which are preferably chilled as indicated at 52. Portions of the sides of the box are also chilled as indicated at 54.

The top of the box has a raised portion the upper surface 60 of which is chilled or hardened. A detachable block or seat plate 62 is rockably mounted on the surface 60 and is held from shifting bodily in any direction by interfitting lugs and cavities on the seat plate and box. Preferably the surface 60 is cylindrical or otherwise slightly crowed longitudinally of the axle and box on a curve of large radius. The lower surface 64 of the seat plate is also shown cylindrically crowned longitudinally of the box to rock on the crowned surface 60 although the crowning may sometimes be confined to one surface alone. The interfitting lugs and cavities preferably comprise downwardly extending lugs 66 at opposite sides of the seat plate, the lugs entering cavities 68 in the box at opposite sides of the longitudinal center. The lugs embrace walls 70 at the sides of the raised portion of the box and so hold the seat plate from shifting bodily crosswise of the box. The end walls of the lugs are slightly crowned vertically as indicated at 69 and are confined between corresponding concave surfaces 71 on the end walls of the cavities 68. This construction holds the seat plate from shifting bodily longitudinally of the box but allows the seat plate and box to have a relative rocking movement longitudinally. Some clearance may exist between the lugs and cavities for manufacturing reasons but this will allow only a very slight twisting of the seat plate on the box around a vertical axis without permitting any material bodily displacement. The seat plate 62 has end flanges 72 and transversely crowned surfaces 74 meeting at a central rib 76 which enters a slot or recess of a frame member such as an equalizer bar and allows a slight transverse rocking of the seat plate and box with respect to the equalizer bar. Slots 78 at the sides of the box are traversed by the bolts 38. As indicated in Fig. 4, the upper surface of the seat plate 62 may be adapted for two oppositely extending equalizer bars by providing two lugs 80 and crowning the upper surfaces as at 82.

Figs. 5, 6 and 7 show a modification. The inner end cap 86 comprises an attaching flange 88 and a pair of grooves 90 and 92 on opposite sides of an annular rib 94. A sealing washer or guard 96 of U-shaped section is held against a shoulder of the axle and its two legs 98 and 100 extend into the grooves 90 and 92, respectively. This effectively prevents egress of oil along the axle and any water getting into the groove 90 may run out through a hole (not shown) at the bottom. The top of the box is provided with a rocking seat plate 102 for a pair of parallel equalizer bars 104 which are seated on crowned surfaces in slots 106 having central ribs 108. The pedestal flanges 110 on the box are closer together to permit the pedestals to pass between the equalizer bars but, in other respects, the construction is substantially the same as shown in Figs. 1, 2 and 3.

We claim:

1. In a device of the character described, a journal box having its top provided with cavities at opposite sides of the longitudinal center, a seat plate rockably mounted on the highest portion of the box and between the cavities and having lugs projecting downwardly into the cavities to hold the seat plate from shifting crosswise of the box, and the cavities having end walls at the ends of the lugs to hold the seat plate from shifting bodily longitudinally of the box; substantially as described.

2. In a device of the character described, a journal box having its top provided with cavities at opposite sides of the longitudinal center, the top of the box between the cavities being crowned longitudinally, a seat plate rockably mounted on the crowned portion of the box between the cavities and having lugs projecting downwardly into the cavities to hold the seat plate from shifting crosswise of the box, the cavities having end walls at the ends of the lugs to hold the seat plate from shifting bodily longitudinally of the box, and a frame member extending crosswise of the box and directly engaging the upper surface of the seat plate; substantially as described.

3. In a device of the character described, a journal box having its top provided with cavities at opposite sides of the longitudinal center, a seat plate rockably mounted on the box between the cavities and having lugs projecting downwardly into the cavities to hold the seat plate from shifting crosswise of the box, the cavities having end walls at the ends of the lugs to hold the seat plate from shifting bodily longitudinally of the box, a frame member extending crosswise of the box, and the upper surface of the seat plate being crowned crosswise of the box to rockably engage the frame member and having an upwardly projecting lug entering a recess in said frame member; substantially as described.

4. In a device of the character described, a journal box having its top provided with a surface crowned longitudinally of the box, a seat plate rockably mounted on the crowned surface, the box and seat plate having interfitting lugs and recesses at opposite sides of the crowned surface to hold the seat plate and box from relative bodily shifting in any direction, a frame member extending crosswise of the box, and the upper surface of the seat plate engaging the frame member; substantially as described.

5. In a device of the character described, a journal box having its top provided with a surface crowned longitudinally of the box with cavities at each side of the crowned surface, a seat plate rockably mounted on the crowned surface and having depending lugs entering the cavities to prevent the plate from shifting crosswise of the box, and the cavities having end walls at the ends of the lugs to hold the plate from shifting bodily longitudinally of the box; substantially as described.

6. In a device of the character described, a journal box having its top provided with a surface crowned longitudinally of the box with cavities at each side of the crowned surface, a seat plate rockably mounted on the crowned surface and having depending lugs entering the cavities to prevent the plate from shifting crosswise of the box, the cavities having end walls at the ends of the lugs to hold the plate from shifting bodily longitudinally of the box, and said plate having a seat on the top for a frame member; substantially as described.

7. In a device of the character described, a journal box having its top provided with a surface crowned longitudinally of the box with cavities at each side of the crowned surface, a seat plate rockably mounted on the crowned surface and having depending lugs entering the cavities to prevent the plate from shifting crosswise of the box, the cavities having end walls at the ends of the lugs to hold the plate from shifting bodily longitudinally of the box, and said plate having an upwardly projecting lug extending longitudinally of the box, and a frame member extending crosswise of the box and having a recess to receive the lug; substantially as described.

8. In a device of the character described, a journal box having its top provided with a raised portion and cavities at each side of the raised portion, a seat plate rockably mounted on the raised portion and having depending lugs embracing the raised portion to prevent the seat plate from shifting crosswise of the box, and the cavities having end walls at the ends of the lugs to hold the seat plate from shifting bodily longitudinally of the box; substantially as described.

9. In a device of the character described, a journal box having its top provided with a raised portion and cavities at each side of the raised portion, a seat plate rockably mounted on the raised portion and having depending lugs embracing the raised portion to prevent the seat plate from shifting crosswise of the box, the cavities having end walls at the ends of the lugs to hold the seat plate from shifting bodily longitudinally of the box, and said plate having an upwardly projecting lug extending longitudinally of the box to enter a recess in a frame member; substantially as described.

10. In a device of the character described, a journal box having its top provided with a raised portion and cavities at each side of the raised portion, a seat plate rockably mounted on said raised portion and having depending retaining lugs embracing the raised portion to prevent the seat plate from shifting crosswise of the box, the cavities having end walls at the ends of the lugs to hold the seat plate from shifting bodily longitudinally of the box, and said seat plate having an upwardly projecting lug extending longitudinally of the box to enter a recess in a frame member, and the upper surface of the seat plate at the sides of the lug having a crowned engagement with the frame member; substantially as described.

11. In a device of the character described, a seat plate having its upper surface crowned transversely, the plate having lugs extending downwardly at opposite sides, and the under surface of the plate between the lugs being crowned longitudinally; substantially as described.

12. In a device of the character described, a seat plate having an upwardly projecting lug extending longitudinally thereof, the plate having lugs extending downwardly at opposite sides, and the under surface of the plate between the lugs being crowned longitudinally; substantially as described.

13. In a device of the character described, a seat plate having an upwardly projecting lug extending longitudinally of the plate, the upper surface of the plate being transversely crowned at opposite sides of the lug, the plate having lugs extending downwardly at opposite sides, and the under surface of the plate being crowned longitudinally between the lugs; substantially as described.

14. In a device of the character described, a seat plate having an upwardly projecting lug extending longitudinally of the plate, the upper surface of the plate being transversely crowned at opposite sides of the lug, the plate having lugs extending downwardly at opposite sides, the under surface of the plate being crowned longitudinally between the lugs, and the end walls of the lugs being vertically curved; substantially as described.

In testimony whereof we hereunto affix our signatures.

RICHARD J. BRITTAIN, Jr.
OTTO W. YOUNG.